July 10, 1956
R. J. BROSAMER
2,754,246
STRIPPING STILL CONTROL ACCORDING TO SPECIFIC GRAVITY
OF LIQUID AND VAPORS INTRODUCED INTO COLUMN
Filed Feb. 25, 1952
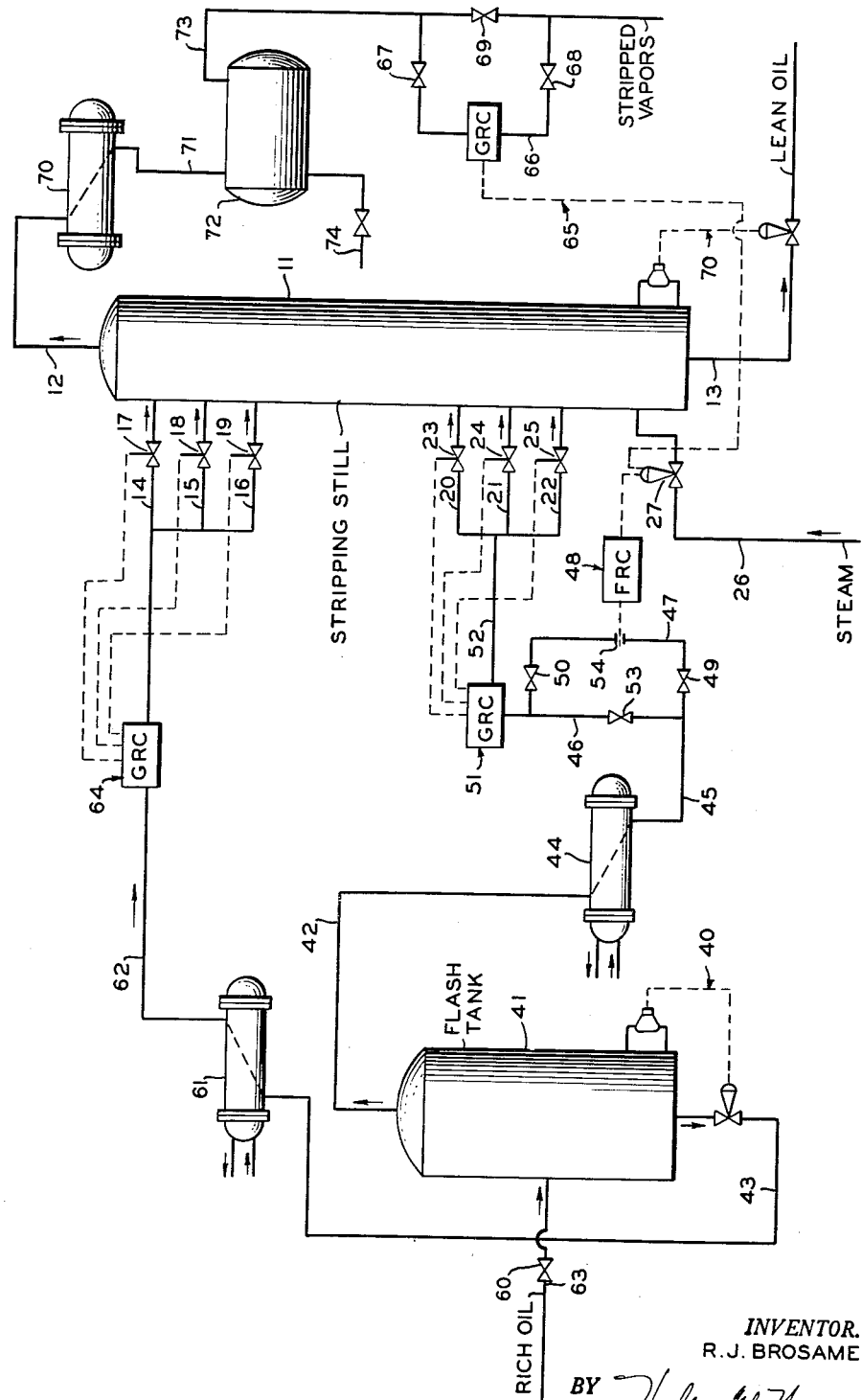
*INVENTOR.*
R. J. BROSAMER
BY Hudson & Young
ATTORNEYS

United States Patent Office 2,754,246
Patented July 10, 1956

2,754,246

STRIPPING STILL CONTROL ACCORDING TO SPECIFIC GRAVITY OF LIQUID AND VAPORS INTRODUCED INTO COLUMN

Robert J. Brosamer, Bartlesville, Okla., assignor to Phillips Petroleum Company, a corporation of Delaware Application February 25, 1952, Serial No. 273,241

13 Claims. (Cl. 196—8)

This invention relates to stripping still operation. In one aspect it relates to a method for controlling the point of introduction of rich oil to a stripping column. In another aspect it relates to a method for controlling the point of introduction of flashed vapors from a rich oil into a rich oil stripping column. In still another aspect it relates to the control of stripping still operation in response to the specific gravity of the overhead vapors.

In conventional gasoline absorption plant operation usual practice includes a flashing operation in which the rich oil containing absorbed normally gaseous hydrocarbons as well as normally liquid hydrocarbons is flashed to lighten the load on the stripping still. The flashed vapors are removed from the flash tank and reabsorbed or combined with stripping still overhead vapors and the mixture passed to a condenser for gasoline or liquefied petroleum gas recovery. In such operations the flash tank overhead vapors contain a considerable portion of such difficultly or non-condensable hydrocarbons as methane and ethane. The bottoms from the flash tank are introduced into the stripping still and steam is added for stripping absorbed hydrocarbons not separated in the flashing operation.

According to the present invention, I find that by using the flash tank overhead vapors as a stripping agent I am able to conduct a stripping operation with the use of less steam than in the above mentioned conventional operation. I also find that it is advantageous to introduce the flash tank vapors at a lower point in the column when these vapors are specifically light, that is, have a relatively low specific gravity. The lower the specific gravity of these vapors the more efficient they are as a stripping agent. I find it advantageous to introduce such vapors into the stripping column at a point relatively close to the conventional point of introduction of the stripping steam. When the flash tank vapors contain heavier material the specific gravity of the vapor stream is greater, some constituents, that is the higher molecular weight constituents, may tend to be absorbed in the oil being stripped and I find it advantageous to introduce such flash vapors at a point farther removed from that at which steam is normally introduced into the stripping column. In any event I find it advantageous to introduce the flash tank vapors at points between the point of introduction of the stripping steam and the point of introduction of the flashed rich oil. In the introduction of the flashed absorption oil, I find it advantageous to introduce it into the column at a point reasonably near the top. The greater the specific gravity of the rich oil the lower is the point of its introduction into the column.

A further point of my invention involves the control of the stripping steam to the column in response to the specific gravity of the stripping still overhead hydrocarbon vapors. This control amounts to determining the specific gravity of the overhead hydrocarbon vapors and when the specific gravity of these vapors increases the rate of introduction of stripping steam is reduced.

An object of my invention is to devise a process for controlling the operation of a stripping still.

Another object of my invention is to devise a process for operating a stripping still in which a minimum of stripping steam is used.

Still another object of my invention is to devise a process for operating a stripping still in which normally gaseous hydrocarbons in process are used as a stripping agent to replace at least a portion of the conventionally used stripping steam.

Yet another object of my invention is to devise an apparatus for carrying out such operational steps.

In the drawing, the figure represents diagrammatically one form of apparatus useful in practicing the process of my invention.

Referring now to the drawing, reference numeral 11 refers to a more or less conventional stripping still. This still is equipped with vapor-liquid contacting or packing apparatus, not shown. This apparatus may be bubble cap tray assemblies or such other packing material as may be desired and which is satisfactory for promoting intimate contact of up-flowing vapors with down-flowing liquid. A line 12 is connected with the top of the column for removal of the stripping still vapors. A line 13 connected with the bottom of the column is for removal of stripped absorption oil, commonly termed lean oil. A liquid level controller assembly 70 is provided for controlling the rate of removal of the lean oil from the kettle section of the column. A pipe 26 containing a throttle valve 27 is provided for inlet of steam to the kettle section of the column. Inlet pipes 14, 15 and 16 are provided at points near the top of the column for inlet of flashed absorption oil. These pipes contain respectively on-off normally closed valves 17, 18 and 19. To the column are also attached pipes 20, 21 and 22 containing on-off normally closed valves 23, 24 and 25 respectively, for introduction of flash tank vapors.

Reference numeral 41 refers to a conventional flash tank provided with a rich oil inlet pipe 63 containing a valve 60, a vapor outlet pipe 42 and a flashed oil outlet pipe 43. A liquid level controller assembly 40 controls the removal of the flashed oil from the bottom of the flash tank. A conduit 43 is provided with a heat exchanger 61 for heating the flash tank bottoms prior to their introduction into the stripping still. A line 62 conducts the flash tank bottoms from the heater 61 to a gravity recorder controller apparatus 64. From this apparatus the oil flows on through line 62 to the above mentioned lines 14, 15 and 16.

The flash tank vapor line 42 is provided with a heater 44. To this heater 44 is connected a pipe 45 which conducts overhead vapors to either a pipe 46 or a pipe 47 depending upon whether a valve 53 in line 46 or a valve 49 in line 47, is opened. The pipe 47 contains another valve 50. This pipe 47 in addition to the two valves contains an orifice 54 which is a part of a flow recorder controller apparatus 48. Pipe 46 is also connected to a gravity recorder controller assembly 51. A line 52 connects this gravity recorder controller assembly 51 with the vapor inlet lines 20, 21 and 22.

The stripping still overhead vapor lines 12 contains a condenser 70 for condensation of stripping steam. A line 71 leads condensate and vapors to an accumulator 72. Water is withdrawn from the accumulator through a line 74 while hydrocarbon vapors flow through line 73. Line 73 is provided with a by-pass line 66 which in turn contains valves 67 and 68. This by-pass line is provided with a gravity recorder controller assembly 65 which operates the throttle valve 27 in the steam inlet line 26. The vapor line 73 contains a valve 69 for opening or closing, depending upon whether the gravity recorder controller assembly 65 is not or is in use.

Gravity recorder controller apparatus, whether for use with liquid or vapor, is well known apparatus and can be obtained from instrument dealers.

In the operation of my process a rich absorption oil such as a conventional mineral seal oil containing absorbed hydrocarbons from a natural gasoline absorption plant, from a source, not shown, is introduced into the flash tank 41 through conduit 63. Pressure reduction occurs on passage of the charge oil through valve 60. In this flash tank rapid evolution of high vapor pressure absorbed gases or flashing takes place. The absorption oil from which these high vapor pressure hydrocarbons have been flashed and still containing some high vapor pressure hydrocarbons in solution, depending upon the pressure maintained in the tank, along with the major portion of the less volatile absorbed hydrocarbons is removed therefrom through the bottoms drawoff line 43. This flashed oil is heated in heater 61 to such a temperature as it is desired to maintain in the top of the stripping column. This heated oil passes on through line 62 and all or a portion passes through the gravity recorder controller apparatus 64 and thence into the stripping column by way of lines 14, 15 or 16. The operation of this gravity recorder controller apparatus 64 is intended to be as follows: When the specific gravity of this flashed oil is relatively low, that is the oil contains an appreciable quantity of the lower molecular weight absorbed hydrocarbons, the apparatus 64 operates to open valve 17 and to close valves 18 and 19 so that this low gravity absorption oil will enter the column 11 at a point near the top. When the absorption oil contains higher molecular weight absorbed hydrocarbons or less lower molecular weight absorbed hydrocarbons and its gravity accordingly is greater, then the gravity recorder controller apparatus 64 operates to close valve 17 and to open either valve 18 or valve 19 depending upon whether the specific gravity of the oil is slightly higher than when valve 17 is opened or whether the specific gravity of the oil is considerably higher. In other words apparatus 64 operates valves 17, 18 and 19 in such a manner that when the oil contains relatively high molecular weight hydrocarbons and its specific gravity is high it is introduced into the column at a relatively low point, that is, through line 16 and when the oil contains less of the high molecular weight hydrocarbons and has a relatively low specific gravity it is introduced into the column through line 14. Line 15 is used when the oil is of intermediate gravity.

In like manner the gravity recorder controller apparatus 51, connected with line 46, operates to control valves 23, 24 and 25 to permit introduction of the flash tank vapors into a selected section of the stripping still dependent upon the specific gravity of these vapors. However, this gravity recorder controller apparatus 51 is intended to operate in such a manner that when the specific gravity of the vapors is high, that is, when the vapors have a relatively high average molecular weight, they are introduced into the still through line 20 at a relatively high point. When the vapors contain less of the high molecular weight hydrocarbons, that is, when the vapors have a relatively low specific gravity they are introduced into the column at a low point such as through line 22. When the vapors are of intermediate specific gravity they are introduced into the still through the intermediate line 21. These flow control valves 17, 18, 19, 23, 24 and 25 are of an on-off type, that is they are fully opened or fully closed, and are of the normally closed type.

As mentioned hereinbefore when the flash tank vapors according to my invention are used to assist in the stripping operation they reduce the stripping steam requirement to the still. They reduce the stripping steam requirement in general in proportion to the rate of introduction of the vapors into the still. The flow recorder controller apparatus 48 is provided with an orifice member in the by-pass line 47 and as the flow of vapors through the orifice increases, the apparatus 40 is intended to throttle by means of valve 27 the flow of steam through line 26 into the column. In like manner when the flow of vapors is diminished through the orifice 54, for any reason whatever, the apparatus 48 is intended to operate to open somewhat the valve 27 and permit the flow of more steam into the stripping column.

As an alternative to the use of this flow recorder control assembly 48 I may use the gravity recorder controller assembly 65. This apparatus is operated in conjunction with the stripping still hydrocarbon vapor line 73 with valves 67 and 68 in the by-pass vapor line 66 open, valve 69 in line 73 being of course closed. This gravity recorder controller apparatus operates in such a manner that when the specific gravity of the hydrocarbon vapors flowing through line 66 increases because of the use of a greater amount of stripping steam the apparatus 65 operates to throttle the valve 27 and reduce the amount of steam introduced into the stripper. In like manner, when the specific gravity of the vapors flowing through line 66 is reduced because of the use of less steam in the stripping still this apparatus 65 operates to open slightly the valve 27 and permit more stripping steam to enter the column. The amount of steam entering the column through line 26 may be too little or too great depending upon changes in the rate of introduction of stripping gases through lines 20, 21 or 22 or whether the flow of stripping gas is charged through line 22, line 21 or line 20.

These gravity recorder controller assemblies 51, 64 and 65 are well known pieces of equipment and may be purchased from instrument supply houses. These controllers may be of the type to control gas pressure to operate pneumatically operable valves, or they may be of the type to control the flow of electric current to operate electrically operable valves. In like manner the on-off valves and throttle valve and the float controller apparatus hereinbefore mentioned may also be obtained from instrument supply houses.

My invention is advantageous when the flashed vapors are introduced into the stripping column through only one inlet line, as for example either line 20, 21 or 22, as long as the point of introduction of the vapor is below the point of introduction of the flashed absorption oil. To take the most advantage of the principles embodied in my invention however, I prefer to use the apparatus herein disclosed and alternately select the point of introduction of the flash tank vapors depending upon their specific gravity. Operation of the column is somewhat smoother when the gravity recorder apparatus 64 is used to select the point of introduction of the flash tank bottoms. By the use of my method of selecting the points of introduction of flashed oil and flash vapors into the stripping column, I am able to reduce materially the steam requirement for such a stripping operation as herein described.

While certain embodiments of the invention have been described for illustrative purposes, the invention obviously is not limited thereto.

As an alternative to condensing the steam from the entire stripper still overhead vapors in line 12 prior to determining the specific gravity of the hydrocarbon portion of the stream, it is advantageous under some circumstances to by-pass from the condenser 70 a small portion of the stream flowing in line 12. This by-pass stream is passed through a desiccant such as an aluminum oxide, and the aluminum oxide dried stream is passed to the gravity-recorder-controller assembly 65. In this manner operation is smooth and unaffected by variations in condenser water temperature and fluctuations in pressure therefrom. And further, all or substantially all of the hydrocarbons in that portion of the hydrocarbon stream are available for passage through the gravity-recorder-controller apparatus.

As an alternative to running the entire streams of flash vapors and flashed absorption oil through their respective specific gravity recorder controllers, it is advantageous under some circumstances to by-pass a small portion of the vapor and liquid streams, and pass these small portions through the gravity recorder controllers. It is sometimes also advantageous to pass through desiccators containing such a desiccant as aluminum oxide the vapor and liquid streams prior to the gravity recorder controllers. Means should be provided to hold constant the temperature of the vapors and the liquid to their respective gravity controllers.

While certain embodiments of the invention have been described for illustrative purposes, the invention obviously is not limited thereto.

I claim:

1. A process for operating a rich absorption oil stripping still comprising flashing a rich absorption oil to produce flash vapors and a flashed absorption oil, introducing stripping steam into the lower portion of a stripping still, introducing the flash vapors into said stripping still at a point nearer the bottom than the top thereof but above said point of introduction of said stripping steam, determining the specific gravity of the flashed absorption oil, introducing this flashed oil into said still at some point nearer the top than the bottom, selecting the exact point of introduction of said flashed oil in response to the specific gravity thereof in such a manner that as the specific gravity of said oil increases it is introduced into said still at a lower point and recovering overhead vapors and still bottoms as products of the process.

2. A process for operating a rich absorption oil stripping still comprising flashing a rich absorption oil to produce flash vapors and a flashed absorption oil, introducing stripping steam into the lower portion of a stripping still, introducing said flashed oil into said still at a point nearer the top than the bottom, determining the specific gravity of the flash vapors, introducing said flash vapors into said still at some point above but nearer the point of steam introduction than to the point of introduction of said oil, selecting the exact point of introduction of said flash vapors in response to the specific gravity of said vapors in such a manner that the vapors of lower specific gravity are introduced into said still at a point nearest the point of introduction of said steam and withdrawing overhead vapors and still bottoms as products of the process.

3. A process for operating a rich absorption oil stripping still comprising flashing a rich absorption oil to produce flash vapors and a flashed absorption oil, introducing stripping steam into the lower portion of a stripping still, introducing the flash vapors into said stripping still at a point nearer the bottom than the top thereof but above said point of introduction of said stripping steam, determining the specific gravity of the flashed absorption oil, introducing this flashed oil into said still at some point nearer the top than the bottom, selecting the exact point of introduction of said flashed oil in response to the specific gravity thereof in such a manner that as the specific gravity of said oil increases it is introduced into said still at a lower point, removing overhead vapors from said still, determining the specific gravity of the removed overhead vapors, regulating the steam input to said still in response to the specific gravity of said overhead vapors in such a manner that as the specific gravity of said overhead vapors increases the rate of steam input decreases and removing said overhead vapors and the still bottoms as products of the process.

4. A process for operating a rich absorption oil stripping still comprising flashing a rich absorption oil to produce flash vapors and a flashed absorption oil, introducing stripping steam into the lower portion of a stripping still, introducing said flashed oil into said still at a point nearer the top than the bottom, determining the specific gravity of the flash vapors, introducing said flash vapors into said still at some point above but nearer the point of steam introduction than to the point of introduction of said oil, selecting the exact point of introduction of said flash vapors in response to the specific gravity of said vapors in such a manner that the vapors of lower specific gravity are introduced into said still at a point nearest the point of introduction of said steam, removing overhead vapors from said still, determining the specific gravity of the removed overhead vapors, regulating the steam input to said still in response to the specific gravity of said overhead vapors in such a manner that as the specific gravity of said overhead vapors increases the rate of steam input decreases and removing said overhead vapors and the still bottoms as products of the process.

5. A process for operating a rich absorption oil stripping still comprising flashing a rich absorption oil to produce flash vapors and a flashed absorption oil, introducing stripping steam into the lower portion of a stripping still, determining the specific gravity of the flashed absorption oil, introducing this flashed oil into said still at some point nearer the top than the bottom, selecting the exact point of introduction of said flashed oil in response to the specific gravity thereof in such a manner that the flashed oil of lower specific gravity is introduced selectively at a higher point up the still, determining the specific gravity of the flash vapors, introducing said flash vapors into said still at a point above but nearer the point of steam introduction than to the top of said still, selecting the exact point of introduction of said flash vapors in response to the specific gravity of said vapors in such a manner that the vapors of lower specific gravity are introduced into said still at a point nearest the point of introduction of said steam, removing overhead vapors from said still, determining the specific gravity of the removed overhead vapors, regulating the steam input to said still in response to the specific gravity of said overhead vapors in such a manner that as the specific gravity of said overhead vapors increases the rate of steam input decreases and removing said overhead vapors and the still bottoms as products of the process.

6. A process for operating a rich absorption oil stripping still comprising flashing a rich absorption oil to produce flash vapors and a flashed absorption oil, introducing stripping steam into the lower portion of a stripping still, introducing the flash vapors into said stripping still at a point nearer the bottom than the top thereof but above said point of introduction of said stripping steam, determining the specific gravity of the flashed absorption oil, introducing this flashed oil into said still at some point nearer the top than the bottom, selecting the exact point of introduction of said flashed oil in response to the specific gravity thereof in such a manner that as the specific gravity of said oil increases it is introduced into said still at a lower point, regulating the steam input to said still in response to the rate of introduction of flash vapors into the still, and removing overhead vapors and bottoms from said still as products of the process.

7. A process for operating a rich absorption oil stripping still comprising flashing a rich absorption oil to produce flash vapors and a flashed absorption oil, introducing stripping steam into the lower portion of a stripping still, introducing said flashed oil into said still at a point nearer the top than the bottom, determining the specific gravity of the flash vapors, introducing said flash vapors into said still at some point above but nearer the point of steam introduction than to the point of introduction of said oil, selecting the exact point of introduction of said flash vapors in response to the specific gravity of said vapors in such a manner that the vapors of lower specific gravity are introduced into said still at a point nearest the point of introduction of said steam, regulating the steam input to said still in response to the rate of introduction of flash vapors into the still, and removing overhead vapors and bottoms from said still as products of the process.

8. A process for operating a rich absorption oil stripping still comprising flashing a rich absorption oil to produce flash vapors and a flashed absorption oil, introducing stripping steam into the lower portion of a stripping still, determining the specific gravity of the flashed absorption oil, introducing this flashed oil into said still at some point nearer the top than the bottom, selecting the exact point of introduction of said flashed oil in response to the specific gravity thereof in such a manner that the flashed oil of lower specific gravity is introduced selectively at a higher point up the still, determining the specific gravity of the flash vapors, introducing said flash vapors into said still at a point above but nearer the point of steam introduction than to the top of said still, selecting the exact point of introduction of said flash vapors in response to the specific gravity of said vapors in such a manner that the vapors of lower specific gravity are introduced into said still at a point nearest the point of introduction of said steam, regulating the steam input to said still in response to the rate of introduction of flash vapors into the still, and removing overhead vapors and bottoms from said still as products of the process.

9. A process for operating a rich absorption oil stripping still comprising flashing a rich absorption oil to produce flash vapors and a flashed absorption oil, heating the flash vapors, introducing the heated flash vapors into said stripping still at a point nearer the bottom than the top thereof, determining the specific gravity of the flashed absorption oil, introducing this flashed oil into said still at some point nearer the top than the bottom, selecting the exact point of introduction of said flashed oil in response to the specific gravity thereof in such a manner that as the specific gravity of said oil increases it is introduced into said still at a lower point and recovering overhead vapors and still bottoms as products of the process.

10. A process for operating a rich absorption oil stripping still comprising flashing a rich absorption oil to produce flash vapors and a flashed absorption oil, introducing said flashed oil into said still at a point nearer the top than the bottom, heating the flash vapors, determining the specific gravity of the heated flash vapors, introducing said heated flash vapors into said still at some point above but nearer the bottom than to the point of introduction of said oil, selecting the exact point of introduction of said flash vapors in response to the specific gravity of said vapors in such a manner that the vapors of lower specific gravity are introduced into said still at a point nearest the bottom, and withdrawing overhead vapors and still bottoms as products of the process.

11. A process for operating a rich absorption oil stripping still comprising flashing rich absorption oil to produce flash vapors and a flashed absorption oil, determining the specific gravity of the flashed absorption oil, introducing this flashed oil into said still at some point nearer the top than the bottom, selecting the exact point of introduction of said flashed oil in response to the specific gravity thereof in such a manner that the flashed oil of lower specific gravity is introduced selectively at a higher point up the still, determining the specific gravity of the flash vapors, introducing said flash vapors into said still at a point nearer the bottom than the top of the still, selecting the exact point of introduction of said flash vapors in response to the specific gravity of said vapors in such a manner that the vapors of lower specific gravity are introduced into said still at a point nearest the bottom, and removing overhead vapors and bottoms from the still as product of the process.

12. A process for operating a rich absorption oil stripping still comprising flashing a rich absorption oil to produce flash vapors and a flashed absorption oil, introducing stripping steam into the lower portion of stripping still, determining the specific gravity of the flashed absorption oil, introducing this flashed oil into said still at some point nearer the top than the bottom selecting the exact point of introduction of said flashed oil in response to the specific gravity thereof in such a manner that the flashed oil of lower specific gravity is introduced selectively at a higher point up the still, determining the specific gravity of the flash vapors, introducing said flash vapors into said still at a point above but nearer the point of steam introduction than to the top of said still, selecting the exact point of introduction of said flash vapors in response to the specific gravity of said vapors in such a manner that the vapors of lower specific gravity are introduced into said still at a point nearest the point of introduction of said steam, and removing overhead vapors and bottoms from said still as products of the process.

13. A process for operating a rich absorption oil stripping still comprising flashing a rich absorption oil to produce flash vapors and a flashed absorption oil, introducing stripping steam into the lower portion of a stripping still, determining the specific gravity of the flashed absorption oil, introducing this flashed oil into said still at some point nearer the top than the bottom, selecting the exact point of introduction of said flashed oil in response to the specific gravity thereof in such a manner that the flashed oil of lower specific gravity is introduced selectively at a higher point up the still, determining the specific gravity of the flash vapors, introducing said flash vapors into said still at a point above but nearer the point of steam introduction than to the top of said still, selecting the exact point of introduction of said flash vapors in response to the specific gravity of said vapors in such a manner that the vapors of lower specific gravity are introduced into said still at a point nearest the point of introduction of said steam, removing overhead vapors from said still, determining the specific gravity of the removed overhead vapors, regulating the steam input to said still in response to the specific gravity of said overhead vapors in such a manner that as the specific gravity of said overhead vapors increases the rate of steam input decreases and removing said overhead vapors and the still bottoms as products of the process.

References Cited in the file of this patent

UNITED STATES PATENTS

| | | |
|---|---|---|
| 2,157,343 | Mateer et al. | May 9, 1939 |
| 2,183,604 | Barton et al. | Dec. 19, 1939 |
| 2,335,009 | Holloway | Nov. 23, 1943 |
| 2,336,097 | Hutchison | Dec. 7, 1943 |
| 2,564,791 | Ribble | Aug. 21, 1951 |
| 2,603,310 | Gilmore | July 15, 1952 |
| 2,638,437 | Ragatz | May 12, 1953 |